J. B. STAVISH.
UNIVERSAL COUPLING.
APPLICATION FILED DEC. 5, 1916.

1,274,805.

Patented Aug. 6, 1918.
2 SHEETS—SHEET 1.

Inventor
J. B. Stavish

Witnesses

By
Attorneys

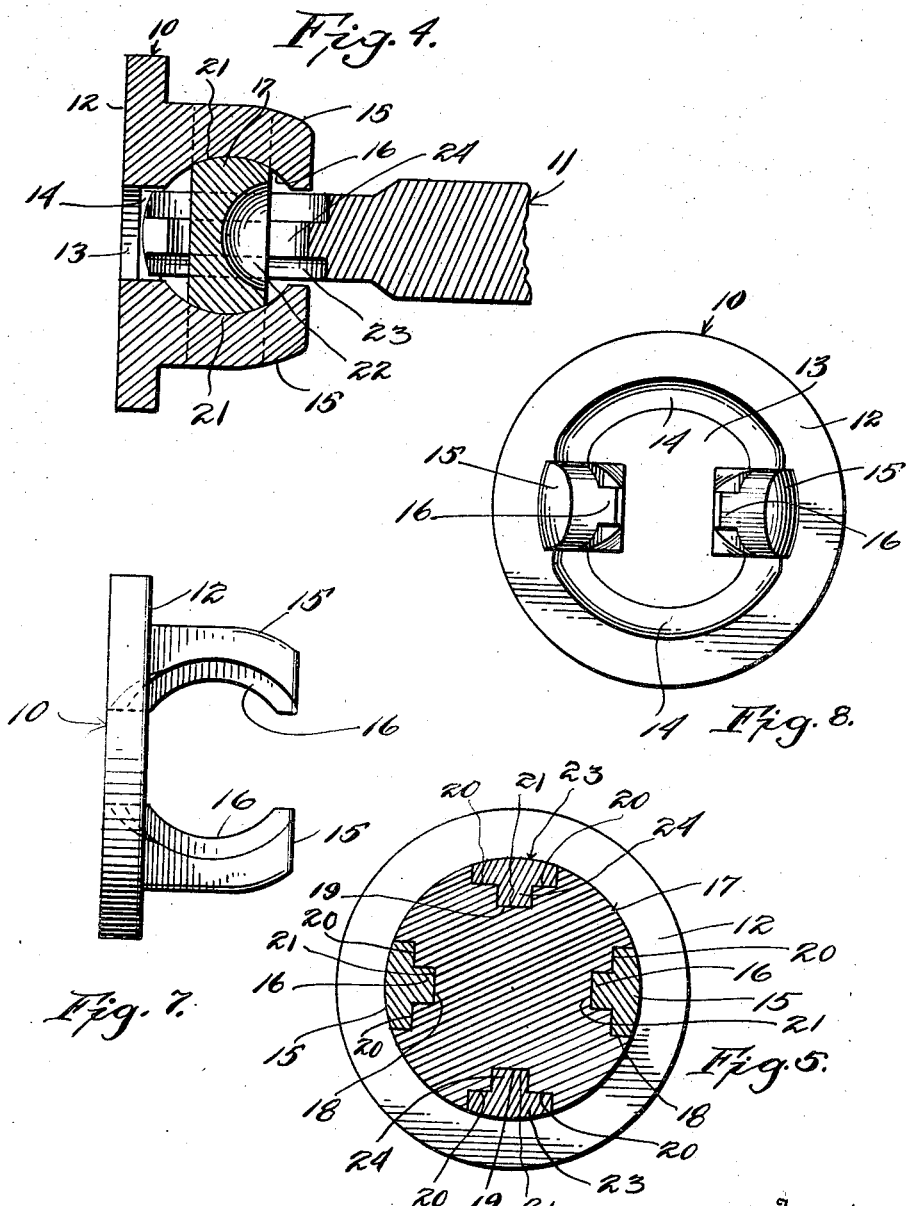

UNITED STATES PATENT OFFICE.

JOSEPH B. STAVISH, OF PLAINFIELD, NEW JERSEY.

UNIVERSAL COUPLING.

1,274,805.　　　　　　Specification of Letters Patent.　　Patented Aug. 6, 1918.

Application filed December 5, 1916. Serial No. 135,129.

*To all whom it may concern:*

Be it known that I, JOSEPH B. STAVISH, a citizen of the United States, residing at Plainfield, in the county of Union, State of New Jersey, have invented certain new and useful Improvements in Universal Couplings; and I do hereby declare the following to be a full, clear, and exact description of the invention, such as will enable others skilled in the art to which it appertains to make and use the same.

This invention is an improvement in couplings and has particular reference to a detachable coupling of the universal type.

An object of the invention is the provision of a coupling the parts of which may be readily disassembled, and to this end, a pair of coupling members having interlocking jaws are mounted upon a knuckle member in such a manner that one of the coupling members may be turned to a position wherein the jaws thereof may be freed from locking engagement with the knuckle member after which the latter may be removed from the other coupling member.

Another object of the invention is the provision of a coupling of this character which is simple in construction, easy to manufacture and effective in carrying out the purpose for which it is desired.

The inventive idea involved is capable of receiving a variety of mechanical expressions, one of which for the purpose of illustrating the invention, is shown in the accompanying drawing wherein:—

Fig. 4 is a similar view taken at right angles to Fig. 3.

Fig. 5 is a transverse section on the line 5—5 of Fig. 1.

Fig. 7 is a side elevation of one of the coupling members.

Fig. 8 is an end elevation thereof.

Figure 1:
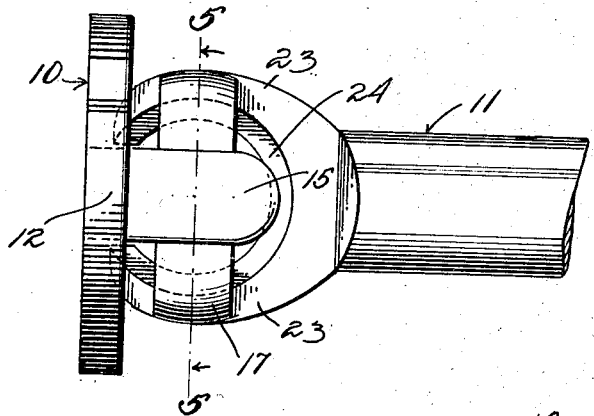
Figure 1 is a side elevation of the coupling showing the parts assembled.

There is shown in the accompanying drawing what is now believed to be a preferred form of the invention which comprises the coupling members 10 and 11, the former consisting of a flat plate or disk 12 having a central opening 13 the inner edges of which are beveled as indicated at 14 for a purpose which will appear in the course of the description. Extending longitudinally from the plate 12 are oppositely disposed curved jaws 15 the inner surfaces of which are provided with arcuate ribs or guide flanges 16 concentric to the axis of said jaws.

A knuckle member 17 is also employed and comprises a flat disk, the thickness of which is less than the distance between the ends of the jaws 15, so that said knuckle member may be mounted in position and removed from engagement with the coupling member 10 in a manner which will more clearly appear in the course of the description. The periphery of the knuckle member 17 is provided with pairs of recesses 18 and 19, the recesses of each pair being oppositely disposed and cut to provide stepped shoulders 20 and 21 the bearing surfaces of which are curved on a line concentric with the transverse axis of the knuckle member. The shoulders 20 of one pair of recesses are adapted to be engaged by the inner surfaces of the jaws 15 while the shoulders 21 of said recesses are engaged by the inner surfaces of the ribs 16 of said jaws 15, the side walls of said recesses also engaging the side walls of said jaws and ribs. It will thus be seen from the foregoing description that the coupling member 10 and knuckle member 17 have movements relative to each other in a certain plane and that, in order to remove said knuckle member from engagement with the said coupling member, said knuckle member need only be rotated to a position wherein its longitudinal axis is at right angles to the longitudinal axis of said coupling member, in which position a portion of said knuckle member will project into the opening 13 in said coupling member, said rotary movement of the knuckle member being also permitted by reason of the beveled edges 14 of said opening, which edges, if they were not beveled, would obstruct the movement of said knuckle member to the position described. When the knuckle member is in this position the same need only be withdrawn from between the free ends of the jaws 15. In assembling the two parts the operation is reversed. The face of the knuckle member adjacent the free ends of the jaws 15 is provided with a central concavity or depression 22 the purpose of which will appear in the course of the description.

Figure 2:
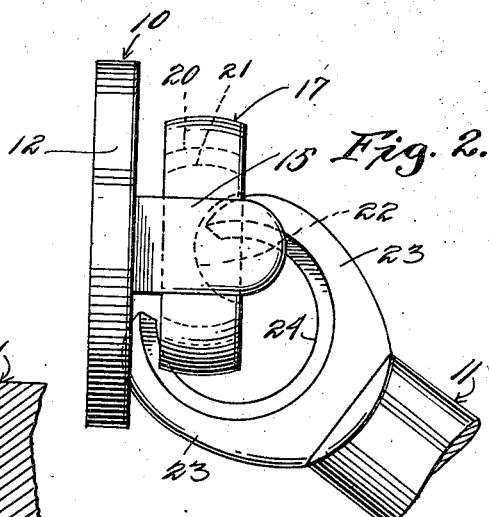
Fig. 2 is a similar view showing a position of one of the members as the same is being uncoupled.
Figure 3:
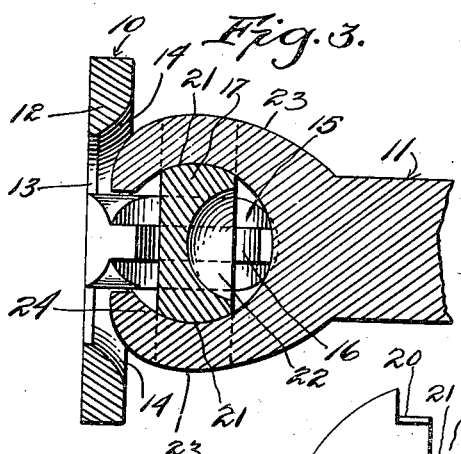
Fig. 3 is a longitudinal sectional view.
Figure 6:
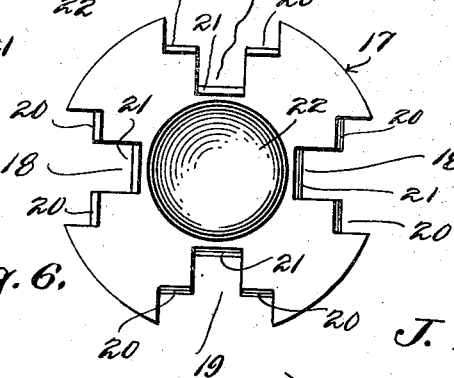
Fig. 6 is a plan view of the knuckle member employed in connection with the invention.

The second coupling member 11 is also provided with curved jaws 23 having a continuous arcuate rib 24 formed upon the inner surfaces of said jaws and terminating at the ends thereof, the distance between the ends of said jaws being greater than the thickness of the knuckle member 17. This coupling member 11 is mounted upon the knuckle member 17 to engage the pair of recesses therein opposite to the pair engaged by the coupling member 10 in the same manner as described in connection with the latter coupling member so that the coupling member 11 may be swung in a plane at right angles to the plane of rotation of the coupling member 10. When it is desired to remove the coupling member 11 from operative engagement with the knuckle member, said coupling member is first swung to the position shown in Fig. 2, the swinging to this position being permitted by reason of the beveled edges 14 of the opening 13 in the coupling member 12. The coupling member 11 may thus be withdrawn laterally until the free end of one of the jaws engages the face of the knuckle member opposite to the face having the depression 22 therein. This engagement is caused by the outer surface of said jaw coming in contact with the adjacent edge of the opening 13 which contact causes a binding action between said jaw and the parts 10 and 17. It is for the purpose of overcoming this binding action, which prevents the complete detachment of the coupling member 11, that the depression 22 is formed in one of the faces of the knuckle member 17. This depression permits of the coupling member 11 being turned slightly so that the free end of the jaw opposite that one between the parts 10 and 17 is moved into said depression so that the other jaw is released from its binding engagement with said parts after which the coupling member 11 may be freely detached. In mounting said coupling member 11 in position the operation just described is reversed.

What is claimed is:—

A universal coupling comprising a coupling member having longitudinally extending jaws and a central opening therebetween having a beveled edge, a notched knuckle member detachably mounted between said jaws and having a central depression in one face and adapted to rotate between said jaws about an axis at right angles to the longitudinal axis of said coupling member, the distance between the ends of the jaws of said coupling member being greater than the thickness of said knuckle member whereby the latter may be removed from between said jaws, and a second coupling member detachably connected to said knuckle member and including jaws for engaging said knuckle member in a plane at right angles to the jaws of the first named coupling member, the space between the ends of the jaws of said second named coupling member being greater than the thickness of said knuckle member, said second coupling member being removable from engagement with said knuckle member by swinging the coupling member until the end of one of its jaws enters the beveled opening and engages the face of the knuckle member opposite that having the depression therein, and the end of the opposite jaw thereof enters said depression whereby to permit of a complete withdrawal of said jaws from engagement with said knuckle member.

In testimony whereof, I affix my signature, in the presence of two witnesses.

JOSEPH B. STAVISH.

Witnesses:
 JOHN L. McDONOUGH,
 L. M. RILLING.